Aug. 23, 1955
F. S. CARVER
2,715,965
PRESSURE FILTER
Filed Oct. 4, 1950
3 Sheets—Sheet 2
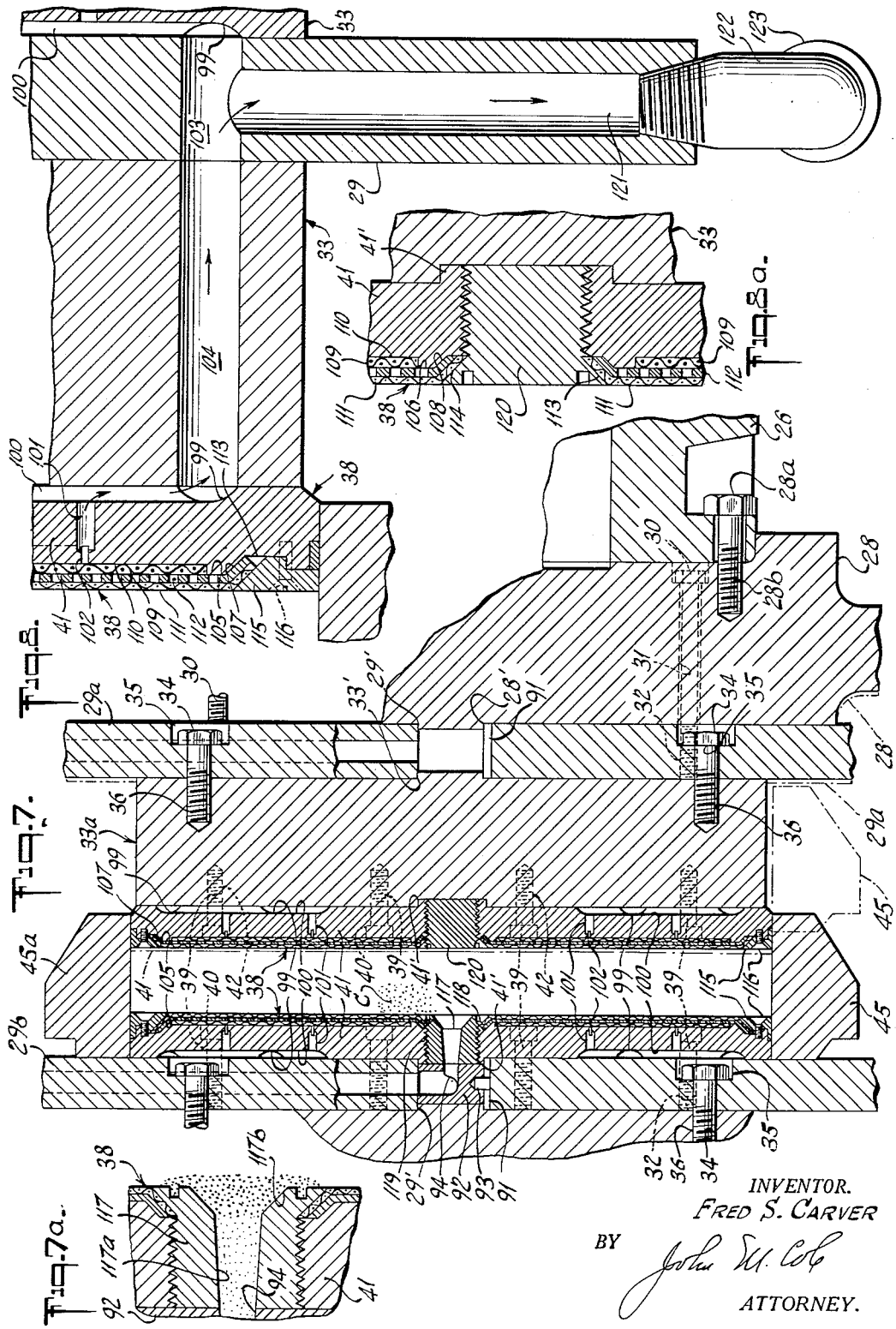
INVENTOR.
FRED S. CARVER
BY
John M. Cole
ATTORNEY.

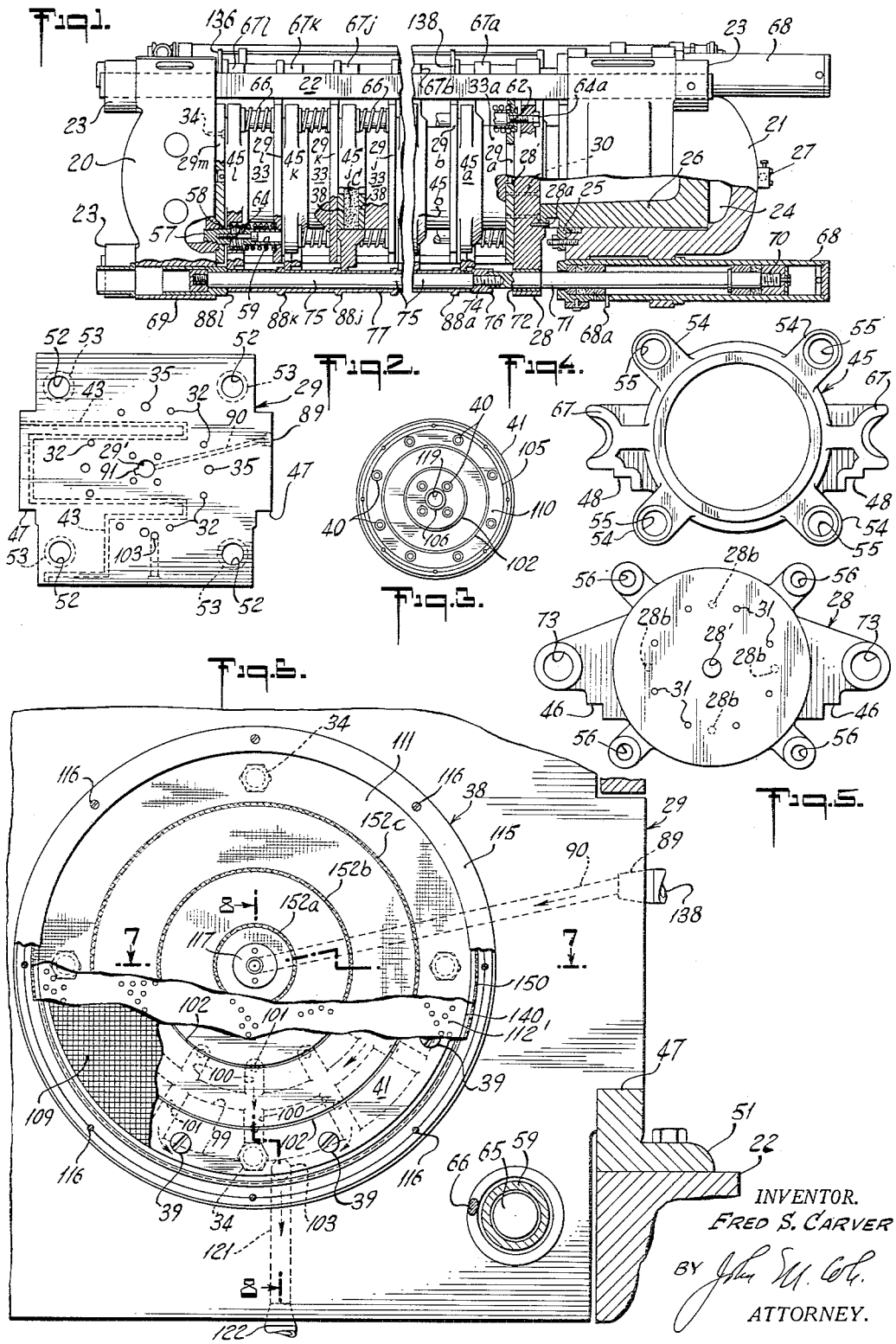

Aug. 23, 1955  F. S. CARVER  2,715,965
PRESSURE FILTER
Filed Oct. 4, 1950  3 Sheets-Sheet 3

INVENTOR.
FRED S. CARVER
BY John M. Cole
ATTORNEY.

United States Patent Office 2,715,965
Patented Aug. 23, 1955

2,715,965

PRESSURE FILTER

Fred S. Carver, Short Hills, N. J., assignor to Fred S. Carver, Inc., Summit, N. J., a corporation of New York Application October 4, 1950, Serial No. 188,371

23 Claims. (Cl. 210—188)

The present invention relates to presses for separating liquid constituents, such as oil or water, from the solid constituents of materials of various kinds, such as cocoa, copra, and other vegetable oil bearing materials, which are in, or have preliminarily been reduced to, substantially semi-liquid state slurries, mother liquors from crystallization, etc., all of which are adapted to be moved and put under pressure by a pumping operation.

With the press of the present invention, feeding is performed by pumping in the material in a more or less fluid state under pressure, the pumping pressure being relatively high, as 800 pounds per square inch, for example, and continued for some time after the press has been filled in order to cause an initial filtering and forming of cakes in the press chambers. The press chambers are then shortened by application of external pressure to remove more liquid and further reduce the cake. The press chambers are then elongated to their original length and opened up in such a way that in a horizontally arranged press the press cakes fall out from the open chambers. The press is reclosed whereupon the press is ready for refilling; and repeating these steps through repeated cycles of operation.

The present invention is more particularly directed toward improvements in presses of the type shown in my United States Patents 2,247,988 of July 1, 1941, 2,072,942 of March 9, 1937, and 1,771,526 of July 29, 1930. The present application is a continuation in part of my application Serial No. 120,381, filed October 8, 1949.

An object of the present invention is to provide a multi-chamber press of the type having filter plates, screens and telescoping rings characterized by the absence of lateral projections so that the resulting cake produced by extracting the liquid materials is a flat disc, smooth on both faces. The elimination of projecting parts from the interior of the chamber, which tend to narrow the chamber in any way, makes it possible to secure greater cake thickness throughout, makes it impossible to overload the press so that it cannot be opened far enough to clear cakes from obstructions which had caused undercuts and facilitates the release of the compressed cake from the screen without having to clear any projecting surface.

Experience has shown that long continued operation of presses such as shown in the patents above referred to brings about conditions adverse to the satisfactory operation of the filter screens per se. In practical operation of such presses, flow of the cake material over the face of the filtering screens may occur, particularly whenever uneven filtering takes place. The accompanying side slip under the high pressures used causes great strain on the filter cloths and in many cases tears or ruptures them. For instance, if there is back flow at the inlet of the chamber or a leaking packing at the circumference of the chamber at the high pressures used, the side-slip of the cake toward the inlet or toward leak at the circumference, will set up sufficient strain in the filter cloth to tear it or distort it out of shape so that it cannot function properly and has to be replaced. In such a case, the side-creep of the cake under high pressure, that is, the strain due to the side-creep of the cake under high pressure, is greater than the strength of the wire facing cloth plus any frictional resistance between the cloth and its backing element so that the cloth is distorted or torn. Another condition under which distortion and damage may occur is when, for any reason, a portion of a filter screen in such press is clogged by gummy matter or the like and the rest is clear. Filtration will occur in the clear portion but little or none at the clogged portion, which leaves a soft spot at such location in the cake. When the pressing stage comes, the cake will creep toward the clogged portion of the screen and tear it in a similar manner. The replacement of the screens is a time-consuming job and involves stoppage of the machine and substantial expense.

A further object of the invention is therefore to provide improved filter screens capable of operating over long periods under the highly adverse conditions above referred to.

Other and further objects of the invention will appear as the description proceeds.

The accompanying drawings show, for purposes of illustrating the present invention, one of the many embodiments in which the invention may take form, it being understood that the drawings are illustrative of the invention rather than limiting the same.

In the drawings:

Figure 1 is a top plan view of a horizontal press with parts broken away and showing the relation of the parts after the chambers have been filled by an extraneous pump with the solids compacted and before ram pressure is applied, the ring-retracting mechanism being shown in section;

Figures 2 to 5 inclusive are elevational views taken from the right of Figure 1, showing respectively, a platen, a filter screen supporting plate, a peripheral chamber closing ring, and the cross-head.

Figure 6 is a still further enlarged view showing an assembly of a platen with associated filter plate, a filter screen, and screen-securing ring, and showing influent and effluent passages;

Figure 7 is a cross-sectional view taken on the broken line 7—7 of Fig. 6, illustrating a complete press chamber unit with the closed chamber filled with material to be pressed;

Figure 7a is a fragmentary view illustrating the formation of a plug in the orifice when pressure is applied;

Figures 8 and 8a are enlarged sectional views on the broken line 8—8 of Figure 6, illustrating the effluent passages;

Figure 9:
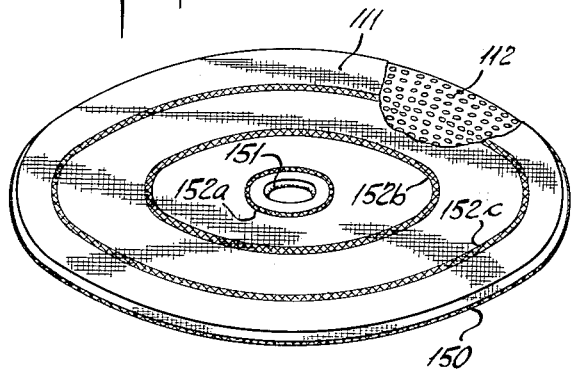
Figure 9 is a perspective view of one of the filter screens, detached from the filter plate.

The horizontal press has two stationary supports, namely, a resistance head 20 and a ram head 21, these heads being interconnected by four square tie members or strain rods 22 threaded on the ends and carrying nuts 23, as indicated more clearly in Figure 1. The ram head 21 has a cylindrical chamber 24, carries a gland ring 25, and receives a ram 26. It is connected at 27 hydraulic mechanism (not shown) whereby oil may be pumped into the ram head under high pressure (say 6000 lbs. per square inch). The cylindrical portion of the ram 26 which travels in the ram cylinder 24 is secured to the ram cross-head (Fig. 5) by bolts 28a entering holes 28b.

Between the cross-head 28 and the resistance head 20, the press has a plurality of chambers, forming units, which, except for terminal connections are duplicates of one another.

On the side of the cross-head 28 opposite the ram it is secured to the first of several steam platens 29, all alike and marked 29a etc., by screws 30 passing through holes 31 in the cross-head and entering tapped openings 32 in the platen. The cross-head has a centering boss 28' to enter a central hole 29' in the platen and assist in aligning the parts.

The right platen 29a, before being secured to the cross-head is secured to one of a plurality of pistons 33 (marked 33a etc.) by screws indicated at 34 passing through counterbored holes 35 in the platen and threaded into tapped openings 36 in the rear face of the piston (see Fig. 7). The pistons have centering bosses 33' to enter the holes 29' in the platens.

The front or left faces of the pistons 33 carry filtering elements, designated generally as 38. These are secured by screws 39 passing through holes 40 in plates 41 and threaded into the pistons at 42, the parts being centered by boss and recess as indicated at 41', Fig. 7.

The other platens 29b etc. carry, on the right face (toward the ram) identical filtering elements secured to them by similar screws 39 threaded into holes 32. The last platen 29m is secured to the resistance-head by another set of screws 34, indicated at the upper left of Fig. 1. The intermediate platens 29b —29m carry on one side a piston 33 and filtering element 38 and on the other side a filtering element 38. Each of the platens has a steam passage indicated in dotted lines 43, Fig. 2, so that the chambers may be heated from both sides.

Peripheral ring members 45 (shown in outline in Fig. 4 and also called chamber rings) are received between adjacent platens 29 and are adapted to fit about the filtering elements 38, when in the chamber closing position of Figs. 1 and 7, or to be retracted about the pistons 33 as shown in dot and dash lines in Fig. 7. The rings are marked 45a etc.

The cross-head 28, platens 29 and rings 45 have bearing surfaces (indicated at 46, 47 and 48, Figs. 5, 2, 4, respectively), which surfaces rest on guides 51 carried by the lower tie or strain members 22 (see Fig. 6). The platens 29 have four holes 52 at the corners, each hole being surrounded by an annular recess 53. The peripheral rings 45, Figure 4, have lugs 54 internally counterbored at 55 spaced the same as the holes 52 in the platens. The cross-head, Fig. 5, has four similarly aligned holes 56 of smaller diameter.

The resistance head 20 carries four shouldered bushings 57 threaded into it and having heads 58 which extend through the holes 52 in the adjacent platen 29m. Each of the other platens 29 carries internally shouldered sleeves 59 on the same spacing as the holes 52. The sleeves 59 receive bolts 64 having heads 65 and are threaded into bushings 57 and into sleeve-carried bushings not shown. The cross-head 28 is, as shown in Fig. 1, connected to the bushings 62 on the adjacent platen by similar bolts 64a in holes 56 so that four aligned lost-motion-tie-connections interconnect the ram with the resistance head and each platen.

Coiled springs 66 are received in the recesses 53 in the platens and bear against the flanges at the bottom of the counterbored holes 55 of the peripheral rings. When the press is assembled, these springs are placed under initial compression. Each set of springs for a peripheral ring acts to push the peripheral ring toward the platen to its left, so as to place the ring in chamber-closing position as shown in Figs. 1 and 7. The reaction of the springs in the left chamber is toward the platen to its right. This carries the corresponding piston with it to spread the filtering elements apart. The cumulative action of the springs insures that all the peripheral rings are in the chamber-closing position, the chambers spread, and that the ram is pushed toward the ram head. The extent of this expanding operation is controlled by the take-up of the lost-motion connections including the sleeves 59 and bolts 64. The ram is stopped by the engagement with the end wall of the ram head. Hydraulic pressure against the ram head will force the ram, cross-head, platens and pistons toward the resistance head, effect filtering and formation of cake C.

The ring retracting mechanism is carried at the front and rear of the machine and at the level of the center line of the press. The rings 45 are provided with forked lugs 67 opposite one another, as more clearly shown in Fig. 4. The ram head carries hydraulic cylinders 68, 68. The resistance head 20 carries guide cylinders 69, 69 at the same level. The cylinders 68 carry pistons, hydraulically operated when ram pressure is released, and connected to piston rods 71 extending through guide bushings 72 carried in openings 73 in the cross-head 28. The rods 71 are drilled and tapped as indicated at 74 to receive the reduced threaded ends of shafts 75. The shafts 75 are long enough to reach over to the resistance head and enter the guide cylinders 69. Near the ram head end, the shafts 75 carry collars 76. These shafts carry collars 88a, etc., for engagement with the forked lugs 67a, etc.

When the springs 66 have moved the peripheral rings to chamber-closing position (as shown in Fig. 1), the lugs 67a, etc., engage with the corresponding collars 88a etc., carried by the shafts 75, and the parts carried by the shafts 75 are so connected so that any leftward movement of the ram will cause the shafts 75 to move to the left pulling the piston rods 71 and pistons 70 to the left.

Upon the application of ram pressure the pistons, platens, etc., are moved toward the resistance head, as indicated by the dotted line position of the parts in Figure 7.

As soon as ram pressure is relieved, the springs 66 act to expand the assemblage, moving the parts from the compressed position to substantially the position of Fig. 1. This movement has caused each piston and filtering element to shift from the closed position where it is against cake C, to the position where it has pulled the right-hand (or piston carried) filtering element 38 away from cake C, as more fully set forth in the application above referred to.

When high pressure liquid is admitted through ports 68a to the left ends of cylinders 68, the pistons 70 and collars 88a, etc., will be shifted to the right and will pull back the cross-head 28 and peripheral rings 45 to open the press chambers, as shown in dotted lines in Figure 7.

Each platen 29 (Fig. 2) is tapped at the inlet 89 (for connection to a pump), and has an obliquely sloping drilling 90 leading to the center opening 29' having a keyway slot cut at 91 opposite the passage 90. The openings 29' receive plugs 92 with keys 93 and angled passages 94 connecting to passage 90.

The rear face of each pressure plate 41 has annular grooves 99, Figs. 3 and 7, forming passages and radial grooves 100 communicating with drillings 101, which in turn communicate with annular grooves 102 on the front face. The outer annular groove 99 on the back face of the pressure plate drains into drillings 103 and 104 in the platen and piston, respectively, as shown more clearly in Fig. 8.

Figure 10:
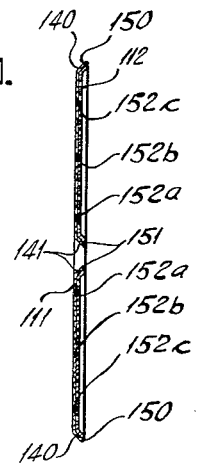
Figure 10 is a diametrical section of the screen of Figure 9.
Figure 11:
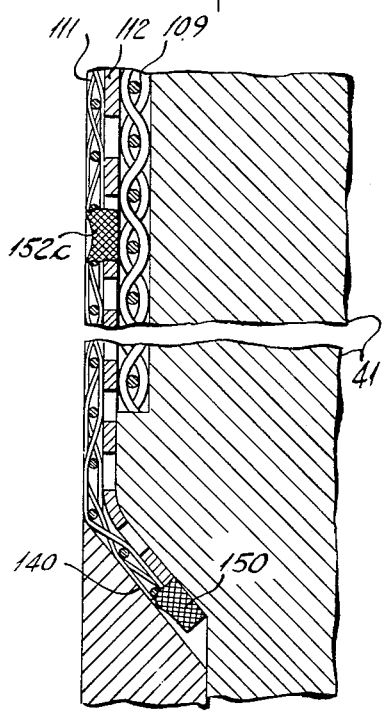
Figure 11 is an enlarged fragmentary sectional view of the same.

The front face of the plate has inner and outer annular, flat, coplanar surfaces 105, 106. Outside the flat surface 105 is a beveled surface 107, and on the inside of surface 106 is another beveled surface 108. A spacer 109 in the form of a relatively coarse, rolled, cross-wire-mesh screen, calendered to flatness, is received in the recess 110 in the front face extending between the flat surfaces 105, 106. A filtering screen 111 made of fine wire and a backing plate 112 of perforated sheet metal, are flanged at the periphery and near the center, as indicated at 113 and 114 (Figs. 8 and 8a) so as to fit about the beveled surfaces 107 and 108. They are welded together as shown in Figures 9–11. A filter screen securing ring 115 is held against the periphery of the filtering screen by screws 116.

The inner flanges of the filter screens secured to plates 41 (carried by platens 29b, etc., inclusive) are secured in place by inlet nozzles 117 having conical heads 118 and threaded into central holes 119 in the plates 41, thereby connecting inlet passage 90 to the chamber. The nozzle is reamed at 117a to have a slight taper and is provided with a taper of about 45° at 117b.

The preliminary pumping operation above referred to fills all chambers with the filterable material and a substantial portion of the liquid content is forced through the screens so as to create deposits in the form of semi-solid cakes which completely fill the chambers. The supply pumps for the material to be filtered are then shut down. High pressure fluid is admitted to the cylinder in the ram head. This fluid pressure, which may be of the order of 6000 pounds per square inch, presses the cross-head and all the pistons, rings, platens and interconnected parts toward the stationary elements carried by the head. This shortens the chambers and presses the available residual liquid from the cakes through the screens and drainage passages. It also tends to push some of the solids back into the nozzle 117, which forms a lug of caked material to plug the nozzle. This action is indicated in Figure 7a by the density of the stippling. Some of the highly compacted material in the chamber will tend to escape by flowing backwardly in the nozzle, but it meets the smoothly polished sloping surface 117b of the nozzle and compacts in a manner to effectively pinch off further flow. The plug acts as a check valve. This plug is only about ¾ inch in diameter at its inner end and is readily sheared off when the press is open and the cake drops.

The screens on the filtering elements carried by pistons are secured in place by plugs 120. Instead of supplying material to be filtered to the chambers by inlets communicating directly to the platen, it is obvious that the feed could be from a platen through a piston and nozzle.

It will be noted that the filtering elements 38 are characterized by the absence of any projections which obstruct or hinder the lateral movement of the cake. When the initial break is made between the filtering element and the right-hand side of the cake C, the cake C has a smooth vertical surface free of undercuts, and when the cake C is broken away from the left filtering element, it has a similar smooth face except for the plug of material hereafter referred to. These faces are vertical in the horizontal press. As soon as the rings 45 are withdrawn far enough to release the cakes, the cakes fall out of the machine onto a cake conveyor, chute or the like, without any hindrance or need for longitudinal movement whatever.

This contour of cake face makes it impossible to overload the machine in such a way that the cake might be formed too thick or clear horizontal projections. The overall capacity of the machine is thus greatly increased over that of the former machine of the same size, wherein the cakes produced necessarily had undercuts which interfered with the cake falling freely out of the open press chambers if filled beyond a certain capacity.

The liquid expressed through the filtering elements 38 enters holes 103 in the platens and 104 in the pistons, which are aligned (Fig. 8), and the liquid received in these passages drains down through a passage 121 leading to the bottom of the platen. The effluent passages 121 are connected by elbows 122 to drain pipe 123.

The liquid feed includes a pump system and piping not shown by which liquid may be delivered to each of the platens (except platen 29a), by pipes 138 connected to the tapped openings 89.

In presses used for the purposes herein referred to it is always possible to have conditions arise which bring about a movement of the solid material to form the cake. Any lack of uniformity of the partly filtered residue in the chamber may, when the hydraulic pressing stage is reached, cause sidewise movement. Any material adjacent a soft spot moves over to fill it, and some movement near the periphery or the central opening will occur. The shifting material must move over the face of the screen cloth. The screen cloth is made of finely woven, stainless steel or Monel metal wire. Single-wire, Dutch twill wire cloth may be 20 x 250 mesh, while triple warp cloth may be 14 x 176 mesh. It will be obvious that the tensile strength of such wire is relatively low.

At the high pressures reached the cake material is rather hard and for movement to take place between it and the wires, the wires tend to shear off the cake projecting into the intervening spaces. This imposes tension on the wires, tending to weaken or slip them and causes rupture adjacent the periphery, on the center, or about a region where a soft spot had occurred. These difficulties are overcome by use of the screens shown in Figs. 9–12.

The reinforcing member 112, which may be a perforated steel plate or heavy woven wire, preferably calendered, and the filter cloth 111 are cut to shape and pressed to form peripheral and central beveled portions as indicated at 140 and 141 so as to fit the plate 41. The periphery of the filter cloth element 111 and the reinforcing element 112 are welded together as indicated at 150. The inner flange or beveled portions of the wire screen 111 and backing member 112 are also welded as indicated at 151. Intermediate annular welds 152a, b, c are also made, uniting the screen cloth and backing member. In practice, these welds may be narrow, say ¼" wide, so that they do not cover a substantial area and impair the filtering operations. These welds are preferably, though not necessarily continuous, and form parting lines and serve to break up the large area of the filter into smaller component areas. As each wire is welded to other wires and to the plate 112, any tension on a wire is taken up by the plate and it is not transmitted across the weld.

The filtering element used opposite the center inlet is flanged as indicated in Figs. 7, 8a, 9 and 10, but where it is desired to employ a form of pressure plate like that shown in Figs. 7 and 8 but without the center plug 120, suitable effluent passages are provided and the filter cloth, the reinforcement and heavy wire spacer are made flat across the center. The cloth and reinforcement are provided with an annular weld such as illustrated at 152a. The peripheral flanges may be omitted when the welded unit is used in a press requiring a flat filter.

Figure 12:
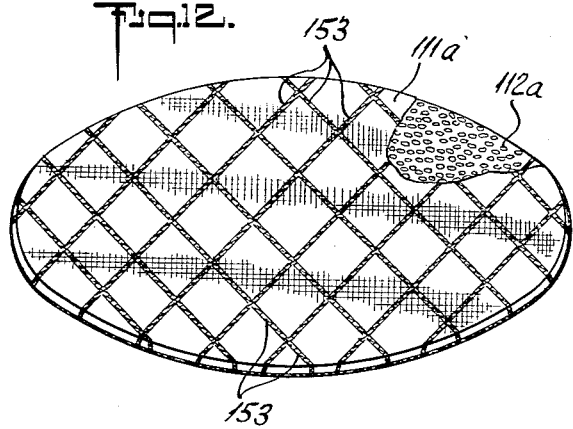
Figure 12 illustrates a modification.

In the modified form of construction of screen and reinforcement illustrated in Fig. 12 the wire screen 111a is annular and has no central opening and it is shown as welded to the reinforcing element 112a by diagonal welds as indicated at 153. These serve to provide small component areas. In each of the forms of construction described, the radial length of the open areas is much less than the distance from the center of the screen to the edge.

Figure 13:
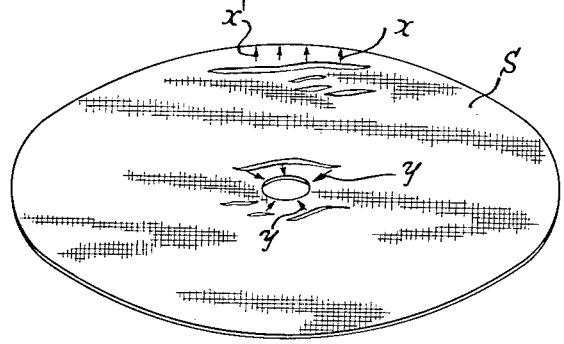
Figure 13 illustrates the type of failure which may occur in the prior art screen.

Figure 13 is a diagrammatic illustration showing how a screen S of the prior art type is likely to fail in use. If, for example, there is a leak near the periphery of the screen, the side slip of the material is radial as indicated by the arrows x. If there is a leak toward the center, the side slip is indicated by the arrows y. In either case these forces, when they overcome the tensile strength of the wire in the screen, rupture the screen so that it opens up and provides leaks through which the solid content tends to escape.

By securely uniting the filter screen cloth and the reinforcement at the periphery and at a number of points over the face of the filter screen, all stresses which come from side slip of the cake material are localized, so as to extend over only relatively small areas. The forces are transmitted by the mesh of wires in this area to the welded regions and thence to the reinforcing plate, so that breaking of the screen wires is much less likely to occur. Various patterns of welding may be employed for the purpose of providing small areas. By thus making the screens less likely to screen failure, it is possible to operate the press under the most adverse conditions for longer periods of time without the difficulty arising from screen failure.

Since it is obvious that the invention may be embodied in other forms and constructions within the scope of the claims, I wish it to be understood that the particular forms shown are but a few of these forms, and various modifications and changes being possible, I do not otherwise limit myself in any way with respect thereto.

What is claimed is:

1. A filtering element comprising a filter screen in the form of a piece of woven wire mesh having a rearwardly extending, obliquely flanged periphery, a pressure plate having effluent passages therethrough and a rearwardly beveled peripheral portion to receive the periphery of the screen, a securing ring having its front face flush with the screen and its rear face beveled to fit about the flanged periphery of the screen, and means to secure the ring to the pressure plate.

2. A filtering element such as claimed in claim 1 wherein the screen has a central opening surrounded by an oblique flange and the plate has a central threaded opening surrounded by a conical surface to fit the inner screen flange, and having a plug having an enlarged head to fit the inner flange and threaded into the central opening in the plate.

3. A filtering element such as claimed in claim 1 wherein the screen has a central opening surrounded by an oblique flange and the plate has a central threaded opening surrounded by a conical surface to fit the inner screen flange, and having a plug having an enlarged head to fit the inner flange and threaded into the central opening in the plate, the plug having an opening for influent.

4. A filtering element comprising a filter screen in the form of a piece of woven wire mesh having a rearwardly extending, obliquely flanged periphery, a perforated backing plate inside the filter screen and similarly flanged, a pressure plate having effluent passages therethrough and a rearwardly beveled peripheral portion to receive the periphery of the screen and backing plate, a securing ring having its front face flush with the screen and its rear face beveled to fit about the flanged peripheries of the screen and backing plate, and means to secure the ring to the pressure plate.

5. A filtering element comprising a filter screen in the form of a piece of woven wire mesh having a rearwardly extending, obliquely flanged periphery, a perforated backing plate inside the filter screen and similarly flanged, a pressure plate having effluent passages therethrough and a rearwardly beveled peripheral portion to receive the periphery of the screen and backing plate, a securing ring having its front face flush with the screen and its rear face beveled to fit about the flanged peripheries of the screen and backing plate, and means to secure the ring to the pressure plate, filter screen and reinforcing member.

6. A filtering element comprising a filter screen in the form of a piece of woven wire mesh having a rearwardly extending, obliquely flanged periphery, a pressure plate having effluent passages therethrough and a rearwardly beveled peripheral portion to receive the periphery of the screen and backing plate, a shallow recess inside the beveled peripheral portion, a porous filter occupying the recess, a securing ring having its front face flush with the screen and its rear face beveled to fit about the flanged peripheries of the screen and backing plate, and means to secure the ring to the pressure plate.

7. A filtering element comprising a filter screen in the form of a piece of woven wire mesh having a rearwardly extending, obliquely flanged periphery, a perforated backing plate inside the filter screen and similarly flanged, a pressure plate having effluent passages therethrough and a rearwardly beveled peripheral portion to receive the periphery of the screen and backing plate, a shallow recess inside the beveled peripheral portion, a porous filter occupying the recess, a securing ring having its front face flush with the screen and its rear face beveled to fit about the flanged peripheries of the screen and backing plate, and means to secure the ring to the pressure plate.

8. A filtering element comprising a filter screen in the form of a piece of woven wire mesh having a rearwardly extending, obliquely flanged periphery, a perforated backing plate inside the filter screen and similarly flanged, a pressure plate having effluent passages therethrough and a rearwardly beveled peripheral portion to receive the periphery of the screen and backing plate, a shallow recess inside the beveled peripheral portion, a porous filler occupying the recess, a securing ring having its front face flush with the screen and its rear face beveled to fit about the flanged peripheries of the screen and backing plate, means to secure the ring to the pressure plate, the screen having a central opening surrounded by an oblique flange, the plate having a central threaded opening surrounded by a conical surface to fit the inner screen flange, and a plug having an enlarged head to fit the inner flange and threaded into the central opening in the plate.

9. A filtering element comprising a filter screen in the form of an annulus of woven wire mesh having rearwardly extending oblique flanges about the periphery and the central opening, a pressure plate having rearwardly beveled surfaces which the flanges overlie and annular bearing surfaces adjacent the beveled surfaces, a ring secured to the pressure plate and having a beveled surface overlying the peripheral flange, and a plug threaded into the central opening in the plate and having a conical surface overlying the inner flange, the plug, ring and screen being co-planar.

10. A filtering element as claimed in claim 9 having a perforated backing plate inside the filter screen and similarly flanged.

11. A filtering element as claimed in claim 10, wherein the filtering screen and backing plate are welded together at the periphery and about the central opening.

12. A filtering element comprising a filter screen in the form of an annulus of woven wire mesh having rearwardly extending, oblique flanges about the periphery and the central opening, a pressure plate having rearwardly beveled surfaces which the flanges overlie and annular bearing surfaces adjacent the beveled surfaces, a ring secured to the pressure plate and having a beveled surface overlying the peripheral flange, a plug threaded into the central opening in the plate and having a tapered surface overlying the inner flange, the ring, plug and screen being co-planar, the plate having a recess between the bearing surfaces and effluent passages from the recess, and a porous wire mesh filler occupying the recess.

13. For use in a filter press, a filtering element comprising a pressure plate having on one face an outer flat annular surface, an inner flat concentric coplanar surface and recessed between said flat surfaces, an outwardly and rearwardly sloping beveled surface about the outer flat surface, an inwardly and rearwardly sloping beveled surface extending inwardly from the inner flat surface, a shallow, flat bottomed recess between the flat surfaces, effluent passages from said recess, a woven wire mesh filler in the recess, a wire mesh screen having flanged surfaces conforming to the beveled surfaces and means for clamping the screen against said beveled surfaces.

14. A filtering element comprising a filter screen in the form of a piece of woven wire mesh having an oblique flanged periphery, a pressure plate having beveled periphery, to receive the periphery of the screen, a ring having a beveled surface overlying the periphery of the screen and a front surface co-planar with the screen surface, and bolts securing the ring in place and holding the screens in place.

15. In a filter, a perforated reinforcing member and a finely woven, metal-wire filter screen welded to the reinforcing member along a plurality of lines which intersect radii from a central region of the screen to form parting strips which subdivide the screen area into component areas of shortened radial length and confine relative movement of screen and reinforcing member in radial directions to the distance separating the welding lines.

16. A filter such as claimed in claim 15, in which the welding lines are circular and the areas annular.

17. A filter such as claimed in claim 15, in which the perforated member and screen have a circular periphery and are welded together at the periphery.

18. A filter such as claimed in claim 15, in which the perforated member and screen have a circular periphery obliquely flanged away from the screen side, and are welded together at the periphery.

19. A filter such as claimed in claim 15, in which the perforated member and screen have a central opening and are welded together about the edges forming said central opening.

20. A filter such as claimed in claim 15, in which the perforated member and screen have a central opening obliquely flanged away from the screen side and are welded together about the edges forming said central opening.

21. A filter such as claimed in claim 15, in which the perforated member and screen have a central opening and a circular periphery and are welded together about the opening and the periphery.

22. A filter such as claimed in claim 15, in which the perforated member and screen have a central opening obliquely flanged away from the screen side and a circular periphery obliquely flanged away from the screen side and are welded together about the opening and the periphery.

23. Means for localizing the sidewise movements of a finely woven metal wire filter screen comprising a perforated metal reinforcing backing to which the screen is welded along lines which form closed figures of less area than the overall area of the screen so that forces applied to the cloth in one area to shift it laterally with respect to the backing are transferred to the reinforcing member and the adjacent screen areas are relieved of the same.

References Cited in the file of this patent

UNITED STATES PATENTS

| | | |
|---|---|---|
| 667,005 | Davis | Jan. 29, 1901 |
| 1,767,078 | Johnson | June 24, 1930 |
| 1,771,526 | Carver | July 29, 1930 |
| 1,801,933 | Ouss | Apr. 21, 1931 |
| 1,971,972 | Adam | Aug. 28, 1934 |
| 1,977,480 | Hiller et al. | Oct. 16, 1934 |
| 2,072,942 | Carver | Mar. 9, 1937 |
| 2,178,416 | Bausman | Oct. 31, 1939 |
| 2,247,988 | Carver | July 1, 1941 |
| 2,472,012 | Hanneman | May 31, 1949 |